(12) United States Patent
Tsutsumi

(10) Patent No.: US 8,184,568 B2
(45) Date of Patent: May 22, 2012

(54) WIRELESS LAN SYSTEM AND WIRELESS COMMUNICATION METHOD

(75) Inventor: Takayuki Tsutsumi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 804 days.

(21) Appl. No.: 11/869,049

(22) Filed: Oct. 9, 2007

(65) Prior Publication Data

US 2008/0089263 A1     Apr. 17, 2008

(30) Foreign Application Priority Data

Oct. 13, 2006   (JP) .................................. 2006-279923

(51) Int. Cl.
*H04H 20/71*   (2008.01)
*H04J 3/24*    (2006.01)

(52) U.S. Cl. ...................... 370/312; 370/349; 455/456.4
(58) Field of Classification Search .................. None
See application file for complete search history.

(56) References Cited

U.S. PATENT DOCUMENTS

| | | | |
|---|---|---|---|
| 5,881,053 A | 3/1999 | Kimball | |
| 6,526,507 B1 | 2/2003 | Cromer et al. | |
| 6,580,704 B1 | 6/2003 | Wellig et al. | |
| 6,771,642 B1* | 8/2004 | Seaver et al. | 370/360 |
| 7,245,946 B2* | 7/2007 | Liu | 455/574 |
| 7,296,091 B1* | 11/2007 | Dutta et al. | 709/245 |
| 7,362,776 B2* | 4/2008 | Meier et al. | 370/468 |
| 7,379,435 B1* | 5/2008 | Kinder | 370/324 |
| 7,433,670 B2* | 10/2008 | Benveniste | 455/343.2 |
| 7,505,447 B2* | 3/2009 | Kish et al. | 370/349 |
| 7,593,745 B2* | 9/2009 | Shih | 455/522 |
| 7,787,436 B2* | 8/2010 | Kish et al. | 370/349 |
| 7,885,217 B2* | 2/2011 | Iyer et al. | 370/311 |
| 2004/0253996 A1* | 12/2004 | Chen et al. | 455/574 |
| 2004/0264397 A1* | 12/2004 | Benveniste | 370/311 |
| 2005/0002395 A1 | 1/2005 | Kondo | |
| 2005/0009578 A1* | 1/2005 | Liu | 455/574 |
| 2005/0152324 A1* | 7/2005 | Benveniste | 370/338 |
| 2006/0018335 A1 | 1/2006 | Koch et al. | |

(Continued)

FOREIGN PATENT DOCUMENTS

EP          1615405 A2     1/2006

(Continued)

OTHER PUBLICATIONS

Meylan et al., U.S. Appl. No. 60/779,824, filed Mar. 7, 2006, pp. 1-15.*

(Continued)

*Primary Examiner* — Gregory Sefcheck
(74) *Attorney, Agent, or Firm* — Sughrue Mion, PLLC

(57) ABSTRACT

Each of a plurality of wireless terminals connected to a wireless LAN base station notifies the base station of an address for receiving data by one-to-many communication from the base station when said wireless terminal executes a program using the one-to-many communication in the wireless LAN. The base station records by relating the address notified from the wireless terminal with an address of the wireless terminal for one-to-one communication. When the base station receives one-to-many communication data to be sent out the wireless LAN, the base station converts an address of destination of the one-to-many communication data into the one-to-one communication address corresponding to said destination and transmits the data whose destination address has been converted into the one-to-one communication address.

5 Claims, 8 Drawing Sheets

U.S. PATENT DOCUMENTS

| | | | |
|---|---|---|---|
| 2006/0094440 A1* | 5/2006 | Meier et al. | 455/453 |
| 2006/0098567 A1* | 5/2006 | Willenegger et al. | 370/206 |
| 2006/0098613 A1 | 5/2006 | Kish et al. | |
| 2006/0112287 A1 | 5/2006 | Paljug | |
| 2006/0146769 A1* | 7/2006 | Patel et al. | 370/338 |
| 2007/0153810 A1* | 7/2007 | Jang et al. | 370/395.53 |
| 2007/0195727 A1* | 8/2007 | Kinder et al. | 370/328 |
| 2007/0297438 A1* | 12/2007 | Meylan et al. | 370/445 |
| 2008/0080446 A1* | 4/2008 | Chung | 370/342 |
| 2008/0137681 A1* | 6/2008 | Kish et al. | 370/432 |
| 2008/0137682 A1* | 6/2008 | Kish et al. | 370/432 |
| 2009/0004971 A1* | 1/2009 | Dateki et al. | 455/62 |
| 2009/0141718 A1* | 6/2009 | Higashida et al. | 370/390 |
| 2009/0252135 A1* | 10/2009 | Benveniste | 370/338 |
| 2010/0182944 A1* | 7/2010 | Kish | 370/312 |

FOREIGN PATENT DOCUMENTS

| | | |
|---|---|---|
| JP | 2003-298602 A | 10/2003 |
| JP | 2004-128949 A | 4/2004 |
| JP | 2004-312564 A | 11/2004 |
| JP | 2005-175610 A | 6/2005 |
| JP | 2005-236991 A | 9/2005 |
| JP | 2006-101148 A | 4/2006 |
| JP | 2006-237828 A | 9/2006 |
| WO | 2005/036818 A1 | 4/2005 |

OTHER PUBLICATIONS

Part 11: Wireless LAN Medium Access Control (MAC) and Physical Layer (PHY) Specifications, 1999 Edition.

D3: IEEE Computer Society: "std 802.11, 1999 Edition (R2003) Part 11: Wireless LAN Medium Access Control (MAC) and Physical Layer (PHY) Specifications" Internet Citation, XP002419949, Retrieved from the Internet: URL:http://grouper. ieee.org/groups/802/11/.

Yun Tao Shi et al: "QoS issues in Wi-Fi-WMM based triple play home networks" Consumer Communications and Networking Conference, 2006. CCNC 2006. 2006 3$^{rd}$ IEEE Las Vegas, NV, USA Jan. 8-10, 2006, Piscataway, NJ, USA, IEEE, Jan. 8, 2006, pp. 188-191, XP010893156.

Chandra, S. et., al. "Application-specific network management for energy-aware streaming of popular multimedia format", USENIX 2002 Annual Technical Conference Paper, pp. 1-18, Dec. 31, 2002.

Office Action dated Jun. 15, 2011 from the Taiwanese Patent Office in counterpart Taiwanese application No. 96137789.

Communication dated Nov. 4, 2011, issued by the Japanese Patent Office in corresponding Japanese Patent Application No. 2006-279923.

Taiwanese Office Action dated Jan. 31, 2012 issued in Taiwanese Application No. 096137789.

* cited by examiner

FIG.4

TERMINAL MANAGEMENT TABLE 205

| BROADCAST/MULTICAST ADDRESS | WIRELESS MAC ADDRESS |
|---|---|
| 03:00:00:BB:BB:BB | 00:00:4C:AA:AA:AA |
| 03:00:00:BB:BB:BB | 00:00:4C:AA:AA:BB |
| 03:00:00:BB:BB:CC | 00:00:4C:AA:AA:CC |
| 03:00:00:BB:BB:DD | 00:00:4C:AA:AA:DD |
| 03:00:00:BB:BB:BB | 00:00:4C:AA:AA:EE |

FIG.5

| | BEFORE CHANGE | | AFTER CHANGE |
|---|---|---|---|
| | MAC OF TRANSMISSION TERMINAL | | MAC OF TRANSMISSION TERMINAL |
| TRANSMITTER MAC ADDRESS | 03:00:00:BB:BB:BB | → (NOT CHANGED) | 00:00:4C:AA:AA:AA |
| DESTINATION MAC ADDRESS | 00:00:00:AA:AA:AA | → (CHANGED) | 00:00:00:AA:AA:AA |
| BSSID (MAC ADDRESS OF BASE STATION) | | → (NOT CHANGED) | 00:00:00:AA:AA:AA |

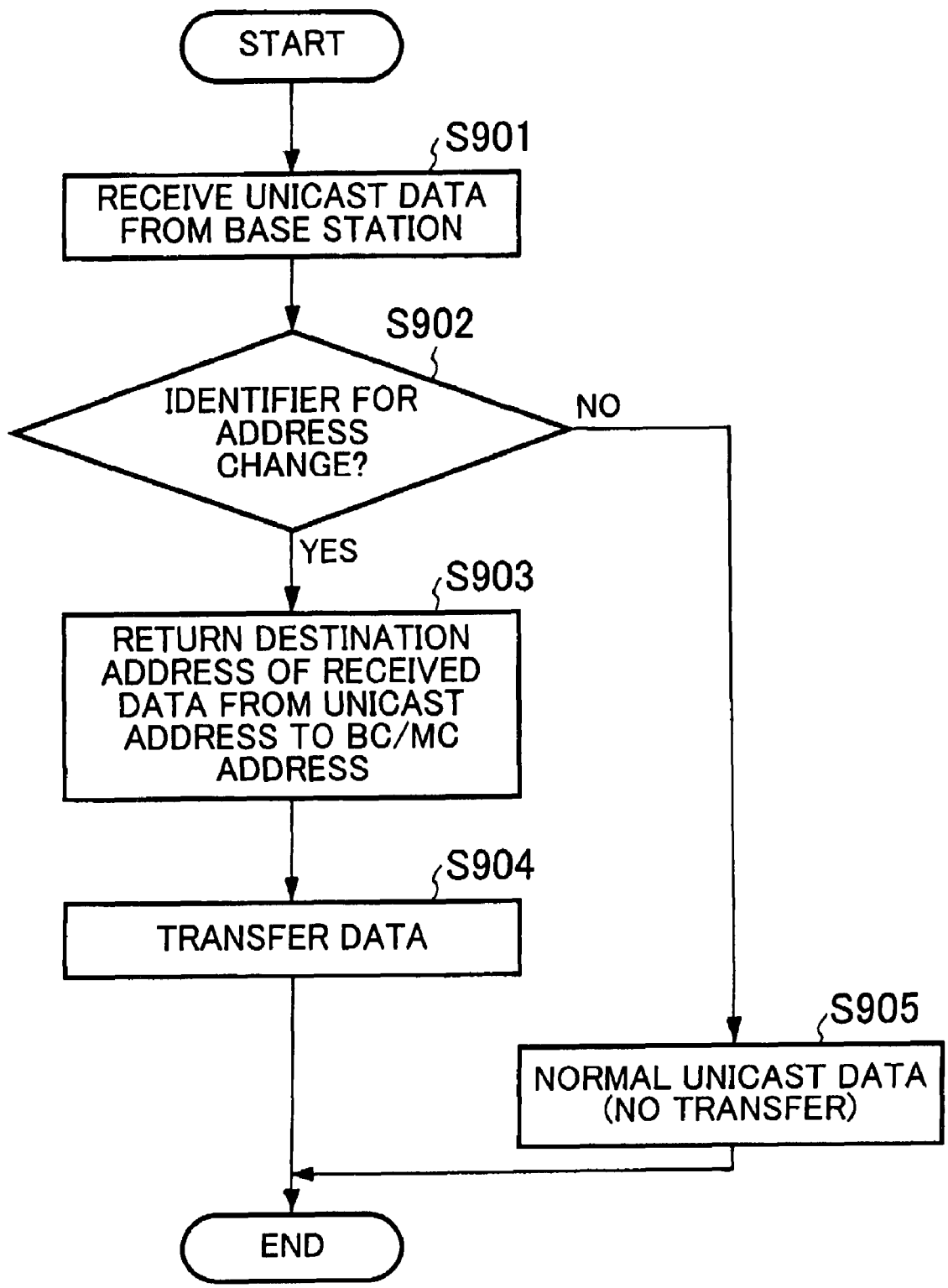

WIRELESS LAN SYSTEM AND WIRELESS COMMUNICATION METHOD

This application is based upon and claims the benefit of priority from Japanese patent application No. 2006-279923, filed on Oct. 13, 2006, the disclosure of which is incorporated herein in its entirety by reference.

BACKGROUND OF THE INVENTION

1. Field of the Invention

This invention relates to a wireless LAN system, or in particular, to a wireless LAN system in which various communication forms such as a one-to-many communication and a one-to-one communication coexist.

2. Description of the Related Art

Types of IP communication for the wireless LAN according to IEEE802.11 and the wired LAN such as Ethernet (registered trade mark) include unicast communication, broadcast communication and multicast communication. The unicast communication is the one-to-one communication in which a base station transmits data to a single terminal address. The broadcast communication and the multicast communication, in contrast, are the one-to-many communication for transmitting data collectively from a base station to a plurality of terminal addresses. In the broadcast communication, the data are transmitted toward all arbitrary terminals existing in a predetermined communication range. In the multicast communication, on the other hand, the data are transmitted to all the terminals designated as destination.

A method of what is called a power-save mode for suppressing a power consumption of the wireless terminals is available as a standard technique according to IEEE802.11 related to the wireless LAN, as described in LAN MAN Standards Committee of the IEEE Computer Society, "Part 11: Wireless LAN Medium Access Control (MAC) and Physical Layer (PHY) Specifications", ANSI/IEEE Std 802.11, 1999 Edition, p. 128-133 (Non-Patent Document 1). According to this method, the wireless terminal switched from a awake mode to a power-save mode enters what is called a sleep mode in which it operates with low power.

Types of a sync signal (hereinafter referred to as a beacon) for the wireless terminals adapted for the power-save mode include TIM (Traffic Indication Map) and DTIM (Delivery TIM). Beacons for TIM and DTIM are transmitted periodically at a preset ratio such as 2 to 1 or 3 to 1. In the broadcast communication or the multicast communication described above, a presence or an absence of data to be received by a terminal is notified by the DTIM beacon. In the presence of the data to be received by the terminal, the data is transmitted immediately after the DTIM beacon from the base station. The wireless terminal constituting the destination address of the broadcast or multicast communication, with an arrival of the DTIM beacon receive timing, is awaken from the sleep mode and, after maintaining the awake state for a predetermined time, receives the data.

FIG. 7 shows an actual example of the broadcast/multicast (BC/MC) communication described above. In the shown case, assume that each wireless terminal (3A/3B) is in effective power-save mode. The wireless LAN base station 1, upon receipt of packets of the broadcast or multicast communication from a transmitter LAN terminal 2 (S701), accumulates the packets sequentially (S702). Also, with an arrival of the TIM beacon timing, the wireless LAN base station 1 sends out the TIM beacon (S703). The wireless terminal 3A and the wireless terminal 3B, after being awaken from the sleep mode and receiving the TIM beacon from the wireless LAN base station 1, returns to the sleep mode again.

After that, with the arrival of the DTIM beacon timing, the wireless LAN base station 1 sends out the DTIM beacon having added thereto the information indicating the accumulation of the data of the BC/MC communication (S704). Then, the particular data is transmitted to the wireless terminal 3A and the wireless terminal 3B (S705). In the meantime, each wireless terminal (3A/3B) maintains the awake mode also after receiving the DTIM beacon and receives the data by BC/MC communication.

SUMMARY OF THE INVENTION

The data of the broadcast/multicast communication distributed by the procedure shown in FIG. 7, however, are not necessarily used by all the wireless terminals that have received it, but may be unnecessary for a part of the wireless terminals. Specifically, in FIG. 7, the data (S705) transmitted by BC/MC communication after the DTIM beacon (S704) may be the data required for the wireless terminal 3A but not required for the other wireless terminal 3B.

In the case where the broadcast/multicast data received is not required, the particular wireless terminal (3B) disposes of the received data, resulting in a waste of the data receiving process. This operation is not desirable for the wireless terminals utilizing the power-save mode intended for suppression of power consumption. Also, a network providing the service frequently using the broadcast/multicast communication generates the receiving process frequently regardless of whether the received data is required or not, and therefore, poses a problem that the power consumption of the wireless terminals is difficult to suppress.

This invention has been achieved in view of the problem described above and the object thereof is to provide a technique for appropriately suppressing the power consumption of the wireless terminals connected to the wireless LAN.

According to this invention, there is provided a wireless LAN system comprising: a base station of a wireless LAN; and a plurality of wireless terminals connected to the base station, wherein each of the wireless terminals comprises an address notification unit notifying the base station of an address for receiving data by one-to-many communication from the base station when said wireless terminal executes a program using the one-to-many communication in the wireless LAN, and the base station comprises a control unit recording by relating the address notified from the wireless terminal with an address of the wireless terminal for one-to-one communication, a converting unit converting an address of destination of one-to-many communication data to be sent out to the wireless LAN into the one-to-one communication address corresponding to said destination, and a wireless LAN unit transmitting the data whose destination address has been converted into the one-to-one communication address.

According to this invention, there is also provided a wireless communication method for a base station of a wireless LAN and a plurality of wireless terminals connected to the base station, comprising: notifying the base station of an address for receiving data by one-to-many communication from the base station by the wireless terminal which executes a program using the one-to-many communication in the wireless LAN; recording by relating the address notified from said wireless terminal with an address of the wireless terminal for one-to-one communication; converting an address of destination of one-to-many communication data to be sent out to the wireless LAN into the one-to-one communication address corresponding to said destination; and transmitting the data whose destination address has been converted into the one-to-one communication address.

According to this invention, the one-to-many communication data to be sent out to the wireless LAN can be transmitted only to a wireless terminal which uses the particular data. As a result, the wireless terminals not requiring the one-to-many communication data can avoid the data receiving process and the power consumption can be suppressed.

BRIEF DESCRIPTION OF THE DRAWINGS

FIG. 4 is a diagram for explaining the terminal management table according to an embodiment;

FIG. 5 is a diagram for explaining the address conversion process according to an embodiment;

FIG. 9 is a flowchart showing the wireless LAN terminal according to another embodiment of the invention.

DESCRIPTION OF THE PREFERRED EMBODIMENT

Figure 1:
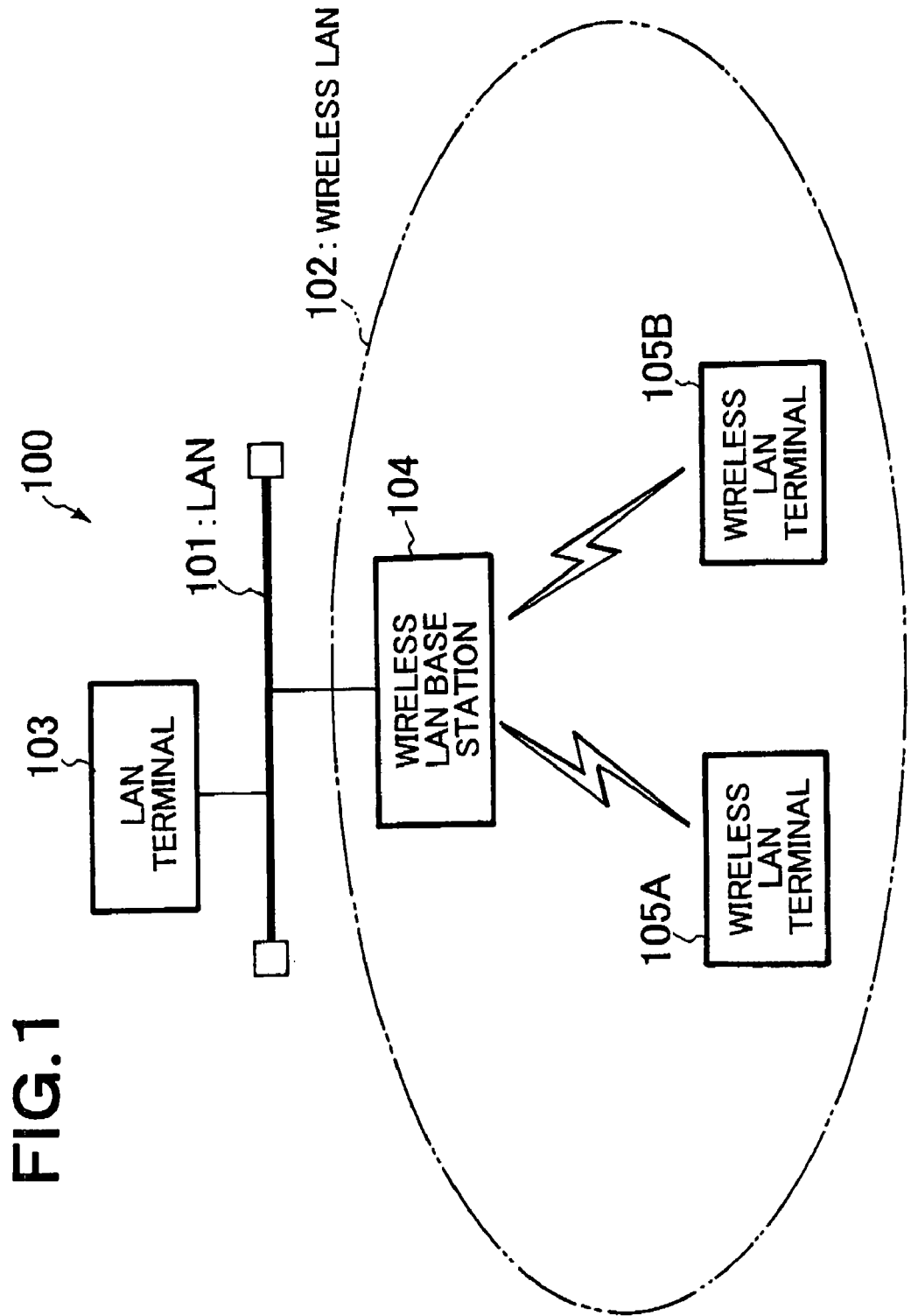
FIG. 1 is a diagram showing a configuration of the system according to an embodiment of this invention.

FIG. 1 shows a configuration of a wireless LAN system according to an embodiment of the invention. A wireless LAN system 100 includes a wireless LAN base station 104 of a wireless LAN 102 and a plurality of wireless LAN terminals 105A, 105B accommodated in the wireless LAN base station 104. The wireless LAN base station 104 is connected to the LAN terminal 103 by a wired LAN 101. The wireless LAN terminal 105A (105B) has the function of power-save mode according to IEEE802.11.

Figure 3:
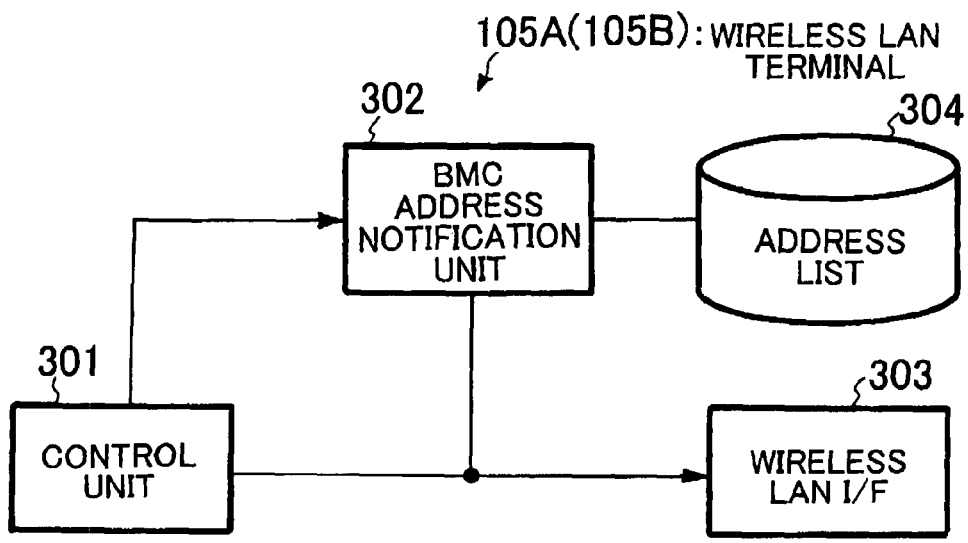
FIG. 3 is a block diagram showing a configuration of the wireless LAN terminal according to an embodiment.

FIG. 3 shows a configuration of the wireless LAN terminal 105A (105B). A wireless LAN interface (I/F) 303 executes the communication process of the wireless LAN 102 based on IEEE802.11. A control unit 301 controls the operation of the local terminal thereof. A BMC address notification unit 302 notifies the wireless LAN base station 104 of an address used for broadcast communication or multicast communication (hereinafter referred to as "the BC/MC communication") with the wireless LAN base station 104. An address list 304 has stored therein the addresses notified to the wireless LAN base station 104 and the address of the local terminal in the unicast communication.

While an application using the data of the BC/MC communication by the wireless LAN base station 104 is operating in the wireless LAN terminal 105A (105B), the control unit 301 supplies the BMC address notification unit 302 with the address for the BC/MC communication described in the address list 304. This address for the BC/MC communication is used by the wireless LAN terminal 105A (105B) to receive the data from the wireless LAN base station 104 in the BC/MC communication. The BMC address notification unit 302 prepares the data for notifying the supplied BC/MC communication address to the wireless LAN base station 104 and transmits the particular data to the wireless LAN base station 104 through the wireless LAN interface 303.

Figure 2:
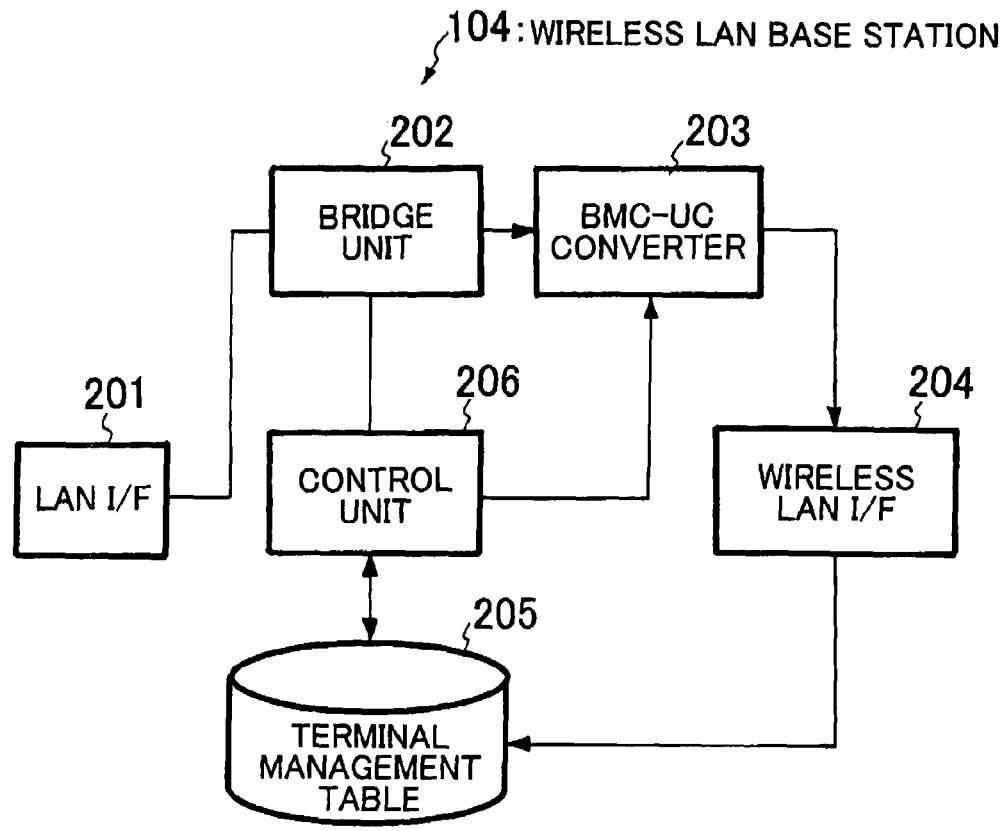
FIG. 2 is a block diagram showing a configuration of the wireless LAN base station according to an embodiment.

FIG. 2 shows a configuration of the wireless LAN base station 104. The LAN interface (I/F) 201 executes the communication process of the wired LAN 101. A bridge unit 202 executes the bridge process between the LAN 101 and the wireless LAN 102. The control unit 206 controls the bridge unit 202 and executes the function of a wireless LAN access point standardized by IEEE802.11. A BMC-UC converter 203 converts a destination of the data transmitted to the wireless LAN 102 from a BC/MC communication address to an unicast communication address. A wireless LAN interface (I/F) 204 executes the communication process of the wireless LAN 102 based on IEEE802.11.

Also, the wireless LAN interface 204 transmits the TIM and DTIM beacons based on the provision of IEEE802.11 periodically to the wireless LAN 102. The BC/MC address notified from the wireless LAN terminal 105A (105B) is registered by the control unit 206 in a terminal management table 205 as information related to the unicast address of the particular wireless terminal.

FIG. 4 shows an example of a terminal management table 205. The terminal management table 205 has recorded therein the "broadcast/multicast address" constituting the address for the BC/MC communication notified from each wireless LAN terminal 105A, 105B and the "wireless terminal MAC address" corresponding to the unicast address of the terminal that has notified the particular broadcast/multicast address. The unicast address recorded in the "wireless terminal MAC address" can be obtained from the header information of the frame transmitted from each wireless LAN terminal 105A, 105B to notify the BC/MC address. Incidentally, the recording pattern is not limited to the one shown but may be appropriately changed.

The control unit 206 of the wireless LAN base station 104, upon receipt of the frame from the LAN 101 or the wireless LAN 102, determines whether the destination address described in the header is registered or not in the "broadcast/multicast address" of the terminal management table 205. In the case where the determination shows that the destination address is so registered, the unicast address corresponding to the particular destination address (BC/MC address) is read from the "wireless terminal MAC address" of the terminal management table 205 and supplied to the BMC-UC converter 203.

The BMC-UC converter 203 converts the BC/MC address constituting the destination address of the frame into the unicast address read from the terminal management table 205. The frame of which the destination address has been converted is transmitted to the corresponding wireless terminal (105A, 105B) by the unicast communication through the wireless LAN interface 204.

Figure 8:
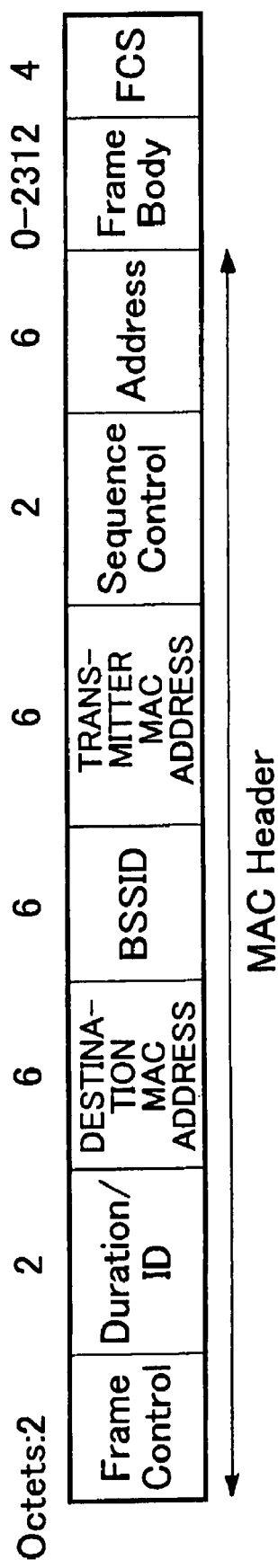
FIG. 8 is a diagram for explaining the frame configuration based on IEEE802.11.

A basic configuration of the MAC frame based on IEEE802.11 is shown in FIG. 8. The destination address converted by the BMC-UC converter 203 described above corresponds to a "destination MAC address" in the "MAC header" shown. Also, the address recorded in the "wireless terminal MAC address" of the terminal management table 205 corresponds to the "transmitter MAC address" in the frame transmitted from the wireless LAN terminal 105A (105B) to notify the BC/MC address.

Figure 6:
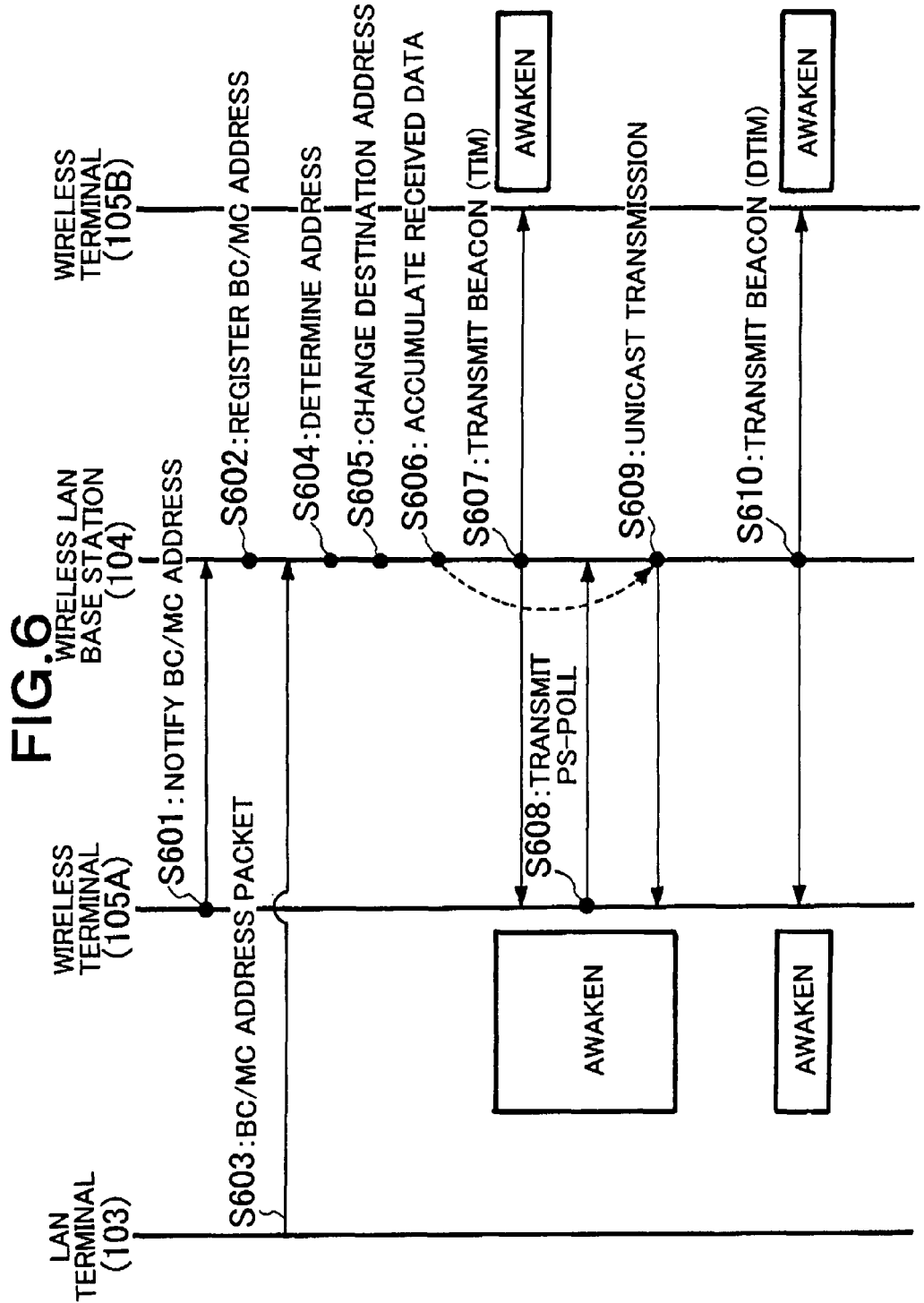
FIG. 6 is a sequence chart showing the operation of the system according to an embodiment.
Figure 7:
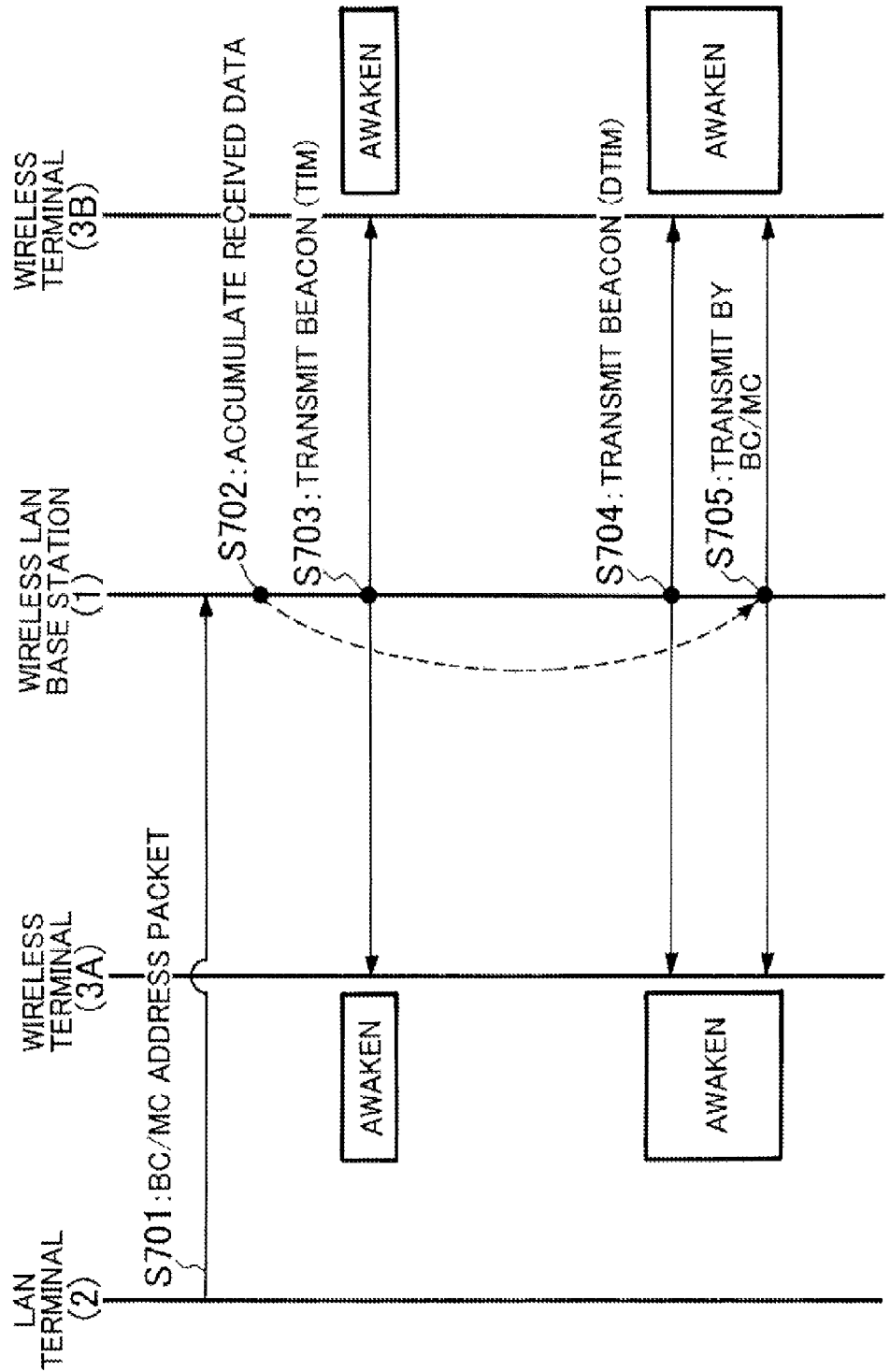
FIG. 7 is a sequence chart showing the operation of the system according to the art related to the invention.

The operation of this embodiment is explained with reference to a sequence chart shown in FIG. 6. The wireless LAN terminal 105A, while executing the application program using the data of the BC/MC communication, notifies the wireless LAN base station 104 of the BC/MC address set in the particular application (S601). The wireless LAN terminal 105A, after notifying the BC/MC address, switches the operation mode thereof from awake mode to sleep (doze)

mode. The other wireless LAN terminal 105B, not currently executing the application program of the BC/MC communication, operates in sleep mode.

The wireless LAN base station 104, upon receipt of the BC/MC address from the wireless LAN terminal 105A, registers it in the terminal management table 205 as information related to the unicast address of the wireless LAN terminal 105A (S602).

The wireless LAN base station 104, upon receipt, from the wired LAN 101, of the BC/MC communication packet transmitted from the LAN terminal 103 (S603), determines whether the destination address of the packet is registered or not in the terminal management table 205 (S604). Once the registration is recognized, the wireless LAN base station 104 reads the unicast address corresponding to the registered BC/MC address from the terminal management table 205, and rewrites the destination address (BC/MC address) of the received packet by the address that has been read.

FIG. 5 shows an example of address conversion. In this case, assume that the unicast address of the wireless LAN terminal 105A is "00:00:4 C:AA:AA:AA". As shown in FIG. 5, the BC/MC address "03:00:00:BB:BB:BB" set in the destination address of the received packet is converted to the unicast address "00:00:4 C:AA:AA:AA" of the corresponding wireless LAN terminal 105A by the wireless LAN base station 104. Incidentally, the transmitter address and the address ("BSSID") of the wireless LAN base station 104 are not changed. The wireless LAN base station 104 sequentially accumulates the data whose destination address has been converted into unicast address (S606).

Then, with the arrival of TIM beacon transmission timing, the wireless LAN base station 104 sends out the TIM beacon to the wireless LAN 102 (S607). The TIM beacon output in the process has set therein an identifier indicating that the unicast data of the wireless LAN terminal 105A is accumulated by the wireless LAN base station 104. This identifier is set in accordance with the standard technique based on IEEE802.11, which is not explained herein.

The wireless LAN terminal 105B in sleep mode, after being awaken and receiving the TIM beacon from the wireless LAN base station 104 while recognizing that the data addressed to the particular local terminal is not accumulated, returns to the sleep mode.

The wireless LAN terminal 105A also in sleep mode, on the other hand, after being awaken from sleep mode and receiving the TIM beacon, recognizes that the unicast data addressed to the particular local terminal is accumulated in the wireless LAN base station 104. The wireless LAN terminal 105A, in order to acquire the accumulated data, sets the PS bit of the PS-Poll frame based on IEEE802.11 to off state and transmits it to the wireless LAN base station 104 (S608). The PS-Poll frame is used to notify the operating mode of a terminal to the base station. In the case where the PS bit is set to off state as described above, it indicates that the terminal is awake, while the PS bit in on state indicates that the terminal is asleep.

The wireless LAN base station 104, upon recognition from the received PS-Poll that the wireless LAN terminal 105A has switched from sleep mode to awake mode, transmits the accumulated unicast data of the wireless LAN terminal 105A (S609). The wireless LAN terminal 105A receives the data from the wireless LAN base station 104, and upon complete receipt, is transferred to sleep mode.

After that, with the arrival of the DTIM transmission timing, the wireless LAN base station 104 sends out the DTIM beacon to the wireless LAN 102 (S610). Originally, the data of the BC/MC communication is transmitted immediately after the DTIM beacon indicating the data accumulation is sent out. In the case under consideration, however, the data of the BC/MC communication has already been transmitted from the LAN terminal 103 to the wireless LAN terminal 105A by unicast communication. As of this timing, therefore, the identifier indicating the accumulation of the data of the BC/MC communication is not set in the DTIM beacon.

The wireless LAN terminal 105A and the wireless LAN terminal 105B, when receiving the DTIM beacon described above, are awaken from sleep mode, and then return to sleep mode again.

As described above, according to this embodiment, the data of the BC/MC communication that have arrived at the wireless LAN base station 104 can be transferred only to the wireless LAN terminal 105A executing the application of the BC/MC communication. The other wireless LAN terminal 105B not executing the application of the BC/MC communication, therefore, requires no data receiving process. Thus, a longer sleep time can be secured.

Next, a modification of the embodiment described above is explained with reference to the flowchart of FIG. 9. This modification assumes a communication form in which the wireless LAN terminal (105A), upon receipt of the data with a destination address converted from the BC/MC address to the unicast address, transfers the particular data to the other terminal.

The BMC-UC converter 203 of the wireless LAN base station 104 according to this modification has a function of adding an identifier, indicating the conversion of BC/MC address into unicast address, to a header of data to be transmitted.

In FIG. 9, the wireless LAN terminal (105A), upon receipt of the unicast data from the wireless LAN base station 104 (S901), determines whether an identifier which indicates the conversion of address is set in the header thereof or not. In the case where the determination shows that the identifier is not set (YES in S902), the destination address of the received data is returned from the unicast address to the BC/MC address (S903). Specifically, the BC/MC address notified to the wireless LAN base station 104 (FIG. 6, S601) is set again as a destination address. Then, the data with the destination address set again as the BC/MC address is transferred to the other terminal (S904).

Incidentally, in the case where the identifier is invalid in the data received from the wireless LAN base station 104 (NO in S902), the wireless LAN terminal (105A) recognizes that the particular data is for normal unicast communication, i.e. the data requiring no transfer.

In the steps shown in FIG. 9, the wireless LAN terminal (105A), upon receipt of the unicast data, can immediately recognize whether the particular data is to be transferred or not. As a result, the data transfer to the other terminal can be smoothly carried out.

As another modification, assume that none of the wireless LAN terminals (105A, 105B) accommodated in the wireless LAN base station 104 is in sleep mode. Then, the data of the BC/MC communication may be sent out to the wireless LAN 102 without changing the destination address. The sleep mode or the awake mode of a terminal can be determined from the on/off state of the PS bit set in the frame from the terminal.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

What is claimed is:

1. A wireless local area network (LAN) system comprising:
   a base station of a wireless LAN, being connected to a LAN terminal; and
   a plurality of wireless terminals connected to the base station, wherein
   each of the wireless terminals comprises:
      means for executing a sleep mode in which the wireless terminal operates with low power,
      means for notifying the base station of a broadcast/multicast (BC/MC) address for receiving data from the base station by BC/MC communication when said wireless terminal executes a program using the BC/MC communication in the wireless LAN,
      means for switching the sleep mode to an awake mode and recognizing whether unicast data to be addressed to said wireless terminal by unicast communication is accumulated by the base station,
      means for switching the awake mode to the sleep mode if the unicast data is not accumulated by the base station, and
      means for notifying the base station of the switching to the awake mode from the sleep mode if the unicast data is accumulated by the base station; and
   the base station comprises:
      means for registering a BC/MC address notified from a wireless terminal of the plurality of wireless terminals as information related to a unicast address of the wireless terminal,
      means for converting BC/MC data addressed to the wireless terminal and received from the LAN terminal into unicast data by rewriting a BC/MC address of the received BC/MC data as the unicast address related to the registered BC/MC address that is the same as the received BC/MC address,
      means for sending information indicating that the unicast data is accumulated by the base station to the wireless terminal,
      means for transmitting the unicast data to the wireless terminal which has notified the base station of the switching to the awake mode from the sleep mode,
      means for sending out a Traffic Indication Map (TIM) beacon and a delivery TIM (DTIM) beacon based on IEEE802.11 to the wireless LAN, wherein transmission timing of the unicast data is related to transmission timing of the TIM beacon and not related to transmission timing of the DTIM beacon, and
      means for determining whether a wireless terminal is in the sleep mode or the awake mode, and sending out the BC/MC data to the wireless LAN without changing a destination address if none of the plurality of wireless terminals is in the sleep mode.

2. A wireless terminal connected to a base station of a wireless LAN, comprising:
   means for executing a sleep mode in which the wireless terminal operates with low power;
   means for notifying the base station of a broadcast/multicast (BC/MC) address for receiving data from the base station by BC/MC communication when the wireless terminal executes a program using the BC/MC communication in the wireless LAN;
   means for switching the sleep mode to an awake mode and recognizing whether unicast data to be addressed to said wireless terminal by unicast communication is accumulated by the base station;
   means for switching the awake mode to the sleep mode if the unicast data is not accumulated by the base station;
   means for notifying the base station of the switching to the awake mode from the sleep mode if the unicast data is accumulated by the base station; and
   means for receiving BC/MC data sent out to the wireless LAN by the base station without changing a destination address if none of wireless terminals in the wireless LAN is in the sleep mode.

3. A wireless local area network (LAN) base station to which a LAN terminal and a plurality of wireless terminals are connected, comprising:
   means for registering a BC/MC address notified from a wireless terminal of the plurality of wireless terminals as information related to a unicast address of the wireless terminal,
   means for converting BC/MC data addressed to the wireless terminal and received from the LAN terminal into unicast data by rewriting a BC/MC address of the received BC/MC data as the unicast address related to the registered BC/MC address that is the same as the received BC/MC address,
   means for sending information indicating that the unicast data is accumulated by the base station to the wireless terminal,
   means for transmitting the unicast data to the wireless terminal which has notified the base station of the switching to the awake mode from the sleep mode,
   means for sending out a Traffic Indication Map (TIM) beacon and a delivery TIM (DTIM) beacon based on IEEE802.11 to the wireless LAN, wherein transmission timing of the unicast data is related to transmission timing of the TIM beacon and not related to transmission timing of the DTIM beacon and
   means for determining whether a wireless terminal is in the sleep mode or the awake mode and sending out the BC/MC data to the wireless LAN without changing a destination address if none of the plurality of wireless terminals is in the sleep mode.

4. The wireless LAN base station according to claim 3, further comprising means for adding an identifier, indicating the conversion of an address of destination of the BC/MC data into a unicast communication address, to said data to be transmitted when the base station executes said conversion.

5. A wireless communication method for a base station of a wireless LAN and a plurality of wireless terminals connected to the base station, the method comprising:
   at a wireless terminal side:
      executing a sleep mode in which the wireless terminal operates with low power:
      notifying the base station of a broadcast/multicast (BC/MC) address for receiving data from the base station by BC/MC communication when said wireless terminal executes a program using the BC/MC communication in the wireless LAN;
      switching the sleep mode to an awake mode and recognizing whether unicast data to be addressed to said wireless terminal by unicast communication is accumulated by the base station;
      switching the awake mode to the sleep mode if the unicast data is not accumulated by the base station; and notifying the base station of the switching to the awake mode from the sleep mode if the unicast data is accumulated by the base station, at the base station side:

registering a BC/MC address notified from a wireless terminal of the plurality of wireless terminals as information related to a unicast address of the wireless terminal;

converting BC/MC data addressed to the wireless terminal and received from the LAN terminal into unicast data by rewriting a BC/MC address of the received BC/MC data as the unicast address related to the registered BC/MC address that is the same as the received BC/MC address;

sending information indicating that the unicast data is accumulated by the base station to the wireless terminal;

transmitting the unicast data to the wireless terminal which has notified the base station of the switching to the awake mode from the sleep mode;

sending out a Traffic Indication Map (TIM) beacon and a delivery TIM (DTIM) beacon based on IEEE802.11 to the wireless LAN, wherein transmission timing of the unicast data is related to transmission timing of the TIM beacon and not related to transmission timing of the DTIM beacon and determining whether a wireless terminal is in the sleep mode or the awake mode, and sending out the BC/MC data to the wireless LAN without changing a destination address if none of the plurality of wireless terminals is in the sleep mode.

* * * * *